(12) United States Patent
Yokohata et al.

(10) Patent No.: US 6,396,661 B1
(45) Date of Patent: May 28, 2002

(54) MAGNETIC DISK DRIVE CAPABLE OF PREVENTING STICTION OF MAGNETIC HEAD

(75) Inventors: Toru Yokohata; Takayuki Yamamoto, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/223,355

(22) Filed: Dec. 30, 1998

(30) Foreign Application Priority Data

Aug. 19, 1998 (JP) .......................................... 10-233071

(51) Int. Cl.⁷ .............................. G11B 21/21; G11B 5/60
(52) U.S. Cl. .................. 360/135; 360/236.6; 360/97.01
(58) Field of Search ............................... 360/135, 97.01, 360/235.8, 236.3, 236.6, 237, 237.1; 428/694 TR, 694 BR, 694 SG (56) References Cited

U.S. PATENT DOCUMENTS

| | | | | |
|---|---|---|---|---|
| 4,550,049 A | * | 10/1985 | Ono et al. ................... | 428/141 |
| 5,062,021 A | * | 10/1991 | Ranjan et al. ............... | 360/135 |
| 5,070,425 A | * | 12/1991 | Inumochi .................... | 360/135 |
| 5,082,709 A | * | 1/1992 | Suzuki et al. ................ | 428/64 |
| 5,144,512 A | * | 9/1992 | Ota et al. .................... | 360/135 |
| 5,166,006 A | * | 11/1992 | Lal et al. ..................... | 428/612 |
| 5,202,810 A | * | 4/1993 | Nakamura et al. .......... | 360/135 |
| 5,210,673 A | * | 5/1993 | Ito et al. ...................... | 360/135 |
| 5,267,104 A | * | 11/1993 | Albrecht et al. ........... | 360/234.1 |
| 5,285,337 A | * | 2/1994 | Best et al. ................. | 360/234.1 |
| 5,285,343 A | * | 2/1994 | Tanaka et al. ............... | 360/131 |
| 5,326,607 A | * | 7/1994 | Muramatsu et al. ... | 428/694 ST |
| 5,388,020 A | * | 2/1995 | Nakamura et al. .......... | 360/135 |
| 5,418,667 A | * | 5/1995 | Best et al. .................. | 360/237 |
| 5,768,055 A | * | 6/1998 | Tian et al. ............... | 360/235.2 |
| 5,841,608 A | * | 11/1998 | Kasamatsu et al. ......... | 360/103 |
| 5,902,665 A | * | 5/1999 | Kuroda ........................ | 428/141 |
| 5,928,759 A | * | 7/1999 | Arita et al. .................. | 428/141 |
| 5,939,170 A | * | 8/1999 | Nishimori et al. .......... | 428/141 |
| 5,949,612 A | * | 9/1999 | Gudeman et al. ........... | 360/135 |
| 6,013,336 A | * | 1/2000 | Baumgart et al. .......... | 427/555 |
| 6,185,071 B1 | * | 2/2001 | Asanai et al. ............ | 360/236.6 |
| 6,188,547 B1 | * | 2/2001 | Gui et al. ................. | 360/236.5 |
| 6,212,042 B1 | * | 4/2001 | Gui et al. ................. | 360/234.1 |
| 6,243,222 B1 | * | 6/2001 | Boutaghou et al. ...... | 360/254.7 |

FOREIGN PATENT DOCUMENTS

| | | | |
|---|---|---|---|
| JP | 56-35 | * | 1/1981 |
| JP | 56-90427 | * | 7/1981 |
| JP | 63-225919 | * | 9/1988 |
| JP | 4-38716 | * | 2/1992 |
| JP | 5-12648 | * | 1/1993 |
| JP | 6-111294 | * | 4/1994 |
| JP | 06243451 | | 9/1994 |
| JP | 6-290452 | * | 10/1994 |
| JP | 8-69674 | * | 3/1996 |

OTHER PUBLICATIONS

IBM Technical Disclosure Bulletin, vol. 34, No. 4B, pp. 158–160, Sep. 1991.*

* cited by examiner

*Primary Examiner*—Brian E. Miller
(74) *Attorney, Agent, or Firm*—Greer, Burns & Crain, Ltd.

(57) ABSTRACT

A magnetic disk drive includes a magnetic recording medium rotatably mounted in a housing, a magnetic head slider having an electromagnetic transducer for reading/writing data from/to the magnetic recording medium, and an actuator for moving the magnetic head slider across tracks of the magnetic recording medium. The magnetic head slider has a medium opposing surface opposed to the magnetic recording medium, and is formed with an air bearing surface and a plurality of projections. The magnetic recording medium has a unidirectional texture which includes a surface roughness composed of numerous microscopic projections having an average top radius of 1 $\mu$m or more.

5 Claims, 9 Drawing Sheets

MAGNETIC DISK DRIVE CAPABLE OF PREVENTING STICTION OF MAGNETIC HEAD

BACKGROUND OF THE INVENTION

1. Field of the Invention

The present invention relates generally to a magnetic disk drive, and more particularly to a magnetic disk drive having an optimum combination of a magnetic head slider having pads and a magnetic disk surface.

2. Description of the Related Art

In recent years, a reduction in size and an increase in capacity of a magnetic disk drive as a kind of external storage device for a computer have been desired. One method of increasing the capacity of the magnetic disk drive is to increase the number of magnetic disks mounted on a spindle, and in association therewith the spacing between the magnetic disks in a recent magnetic disk drive has increasingly been reduced. In a recent magnetic disk drive, a flying type magnetic head slider adopting a contact start and stop (CSS) system has frequently been used. In such a flying type magnetic head slider adopting the CSS system, a magnetic head slider comes to contact with a magnetic disk when the disk drive stops operation, whereas the magnetic head slider is kept flying at a microscopic height from the disk surface by an air flow generating over the surface of the magnetic disk rotating at a high speed in recording or reproducing information.

In the flying type magnetic head slider adopting the CSS system, an electromagnetic transducer (magnetic head element) is built in the slider for receiving the air flow generating over the disk surface, and the slider is supported by a suspension. Accordingly, when the magnetic disk remains still, the slider including the electromagnetic transducer is in contact with the magnetic disk surface, whereas when the magnetic disk is rotated, a disk opposing surface (flying surface) of the slider opposed to the magnetic disk receives an air flow generated by rotation of the magnetic disk, and the slider flies from the disk surface. The electromagnetic transducer built in the slider is moved over the disk surface as being supported by the suspension to perform recording or reproduction of information at a given track.

In a magnetic disk drive employing a conventional flying type magnetic head slider, a pair of rails are provided on opposite side portions of the disk opposing surface of the magnetic head slider. Each rail has a flat air bearing surface. Further, a tapering surface is formed on each rail at its air inlet end portion. The air bearing surface of each rail receives an air flow generated by high-speed rotation of a magnetic disk to fly the slider and stably maintains a microscopic distance between the disk surface and the electromagnetic transducer.

According to the CSS system, a high flying stability and a microscopic flying height (submicrons) can be ensured. However, when the disk remains still, rail surfaces (air bearing surfaces) of the slider are in contact with the disk. Accordingly, when the magnetic disk drive starts or stops operation, the air bearing surfaces relatively slides on the disk. Accordingly, if the surface roughness of the magnetic disk is small, a contact area of the air bearing surfaces to the magnetic disk surface in the still condition of the magnetic disk is large, so that there arises a problem of stiction between the magnetic head slider and the magnetic disk at starting rotation of the magnetic disk.

To avoid the stiction, the surface roughness of the magnetic disk has conventionally been increased to a suitable level. However, the necessity for further reducing the surface roughness of the magnetic disk has recently been increased to reduce the flying height of the magnetic head slider in response to the requirement for high-density recording. In general, a protective film made of a hard material such as carbon and a lubricating layer for reducing friction and wear of the protective film to improve durability of the magnetic disk are formed on a recording layer of the disk owing to the presence of the lubricating layer, friction and wear of the protective film can be reduced. However, when the disk drive stops operation, there is a possibility that stiction between the disk and the slider may occur to cause a problem that the disk drive cannot be restarted.

In association with a recent increase in amount of information, the development in high density, large capacity, and small size of a magnetic disk drive has become remarkable, and the occurrence of stiction has been greatly highlighted as a cause of faulty operation due to a reduction in torque of a spindle motor in association with the size reduction and due to smoothing of the disk surface for the high density. To reduce the stiction between the slider and the disk, it has been proposed to perform crowning of the flying surfaces (rail surfaces) of the slider over the entire length in the longitudinal direction to thereby reduce a contact area between the slider and the disk.

While the slider thus crowned is effective for prevention of the stiction, there is a problem that variations in working accuracy are large and an increase in cost of the slider is invited, so that such a slider is unsuitable for mass production. Further, crowning is performed in the longitudinal direction of each flying surface of the slider, so that each rail surface of the slider becomes nearer to the disk than the electromagnetic transducer (head element) formed on an air inlet end surface of the slider, causing a problem that a spacing loss is produced.

Further, the use of a contact type head intended to attain a zero flying height has recently started to be considered in response to the development in high density, and it is therefore more important to prevent the stiction between the disk and the slider causing faulty operation and fracture of the electromagnetic transducer or the recording layer of the disk. To prevent this stiction problem, it has been proposed to provide a plurality of projections (pads) on the flying surfaces (air bearing surfaces) of the slider, thereby reducing a contact area between the slider and the disk surface (Japanese Patent Laid-open No. 8-69674).

However, the technique disclosed in this publication is characterized in that the contact between the air bearing surfaces of the slider and the magnetic disk surface is avoided by making the projections formed on the air bearing surfaces into sliding contact with the magnetic disk surface. However, there arises another problem of abrasion of the projections formed on the air bearing surfaces due to the sliding contact with the disk surface.

SUMMARY OF THE INVENTION

It is therefore an object of the present invention to provide a magnetic disk drive which can effectively avoid the stiction and can suppress the abrasion of the projections on the air bearing surfaces by subjecting the surface of the recording medium to sufficiently controlled texture forming.

It is another object of the present invention to provide a magnetic disk drive which can suppress the generation of dust by suppressing the abrasion of the projections on the air bearing surfaces, thereby achieving high reliability allowing long-term stable operation.

In accordance with an aspect of the present invention, there is provided a magnetic disk drive comprising a housing; a magnetic recording medium rotatably mounted in said housing; a magnetic head slider having an electromagnetic transducer for reading/writing data from/to said magnetic recording medium; and an actuator for moving said magnetic head slider across tracks of said magnetic recording medium; wherein said magnetic head slider has a medium opposing surface opposed to said magnetic recording medium, said medium opposing surface being formed with an air bearing surface and a plurality of projections; and said magnetic recording medium has a unidirectional texture and a surface roughness composed of numerous microscopic projections having an average top radius of 1 μm or more when detected by using a fixed detection length falling in the range of 150 nm to 600 nm.

The above detecting method using the fixed detection length for the surface roughness may be replaced by a method using a threshold height. In this case, the magnetic recording medium has a surface roughness composed of numerous microscopic projections having an average top radius of 1 μm or more when detected by using a fixed threshold height falling in the range of 0.3 nm to 0.5 nm. Preferably, the surface roughness of the magnetic recording medium is defined by an average roughness Ra of 0.3 nm to 3 nm and a maximum height Rmax of 0.6 nm to 30 nm. The plurality of projections are formed on the air bearing surface or on a portion of the medium opposing surface except the air bearing surface. Preferably, the unidirectional texture is defined as a texture in which microscopic projections each having a minor axis/major axis ratio of 0.05 or less are present in an amount of 45% or more of all microscopic projections.

In accordance with another aspect of the present invention, there is provided a magnetic disk drive comprising a housing; a magnetic recording medium rotatably mounted in said housing; a magnetic head slider having an electromagnetic transducer for reading/writing data from/to said magnetic recording medium; and an actuator for moving said magnetic head slider across tracks of said magnetic recording medium; wherein said magnetic head slider has a medium opposing surface opposed to said magnetic recording medium, said medium opposing surface being formed with an air bearing surface and a plurality of projections; and said magnetic recording medium has a nondirectional texture and a surface roughness composed of numerous microscopic projections having an average top radius of 0.3 μm to 0.75 μm when detected by using a fixed detection length falling in the range of 40 nm to 150 nm.

The above detecting method using the fixed detection length for the surface roughness may be replaced by a method using a threshold height. In this case, the magnetic recording medium has a surface roughness composed of numerous microscopic projections having an average top radius of 0.3 μm to 0.75 μm when detected by using a fixed threshold height falling in the range of 0.3 nm to 0.5 nm. Preferably, the surface roughness of the magnetic recording medium is defined by an average roughness Ra of 0.3 nm to 3 nm and a maximum height Rmax of 0.6 nm to 30 nm. The plurality of projections are formed on the air bearing surface or on a portion of the medium opposing surface except the air bearing surface. Preferably, the nondirectional texture is defined as a texture in which microscopic projections each having a minor axis/major axis ratio of 0.5 or more are present in an amount of 55% or more of all microscopic projections, and the average top radius is defined as an average of top radii of the microscopic projections measured along their major axes.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
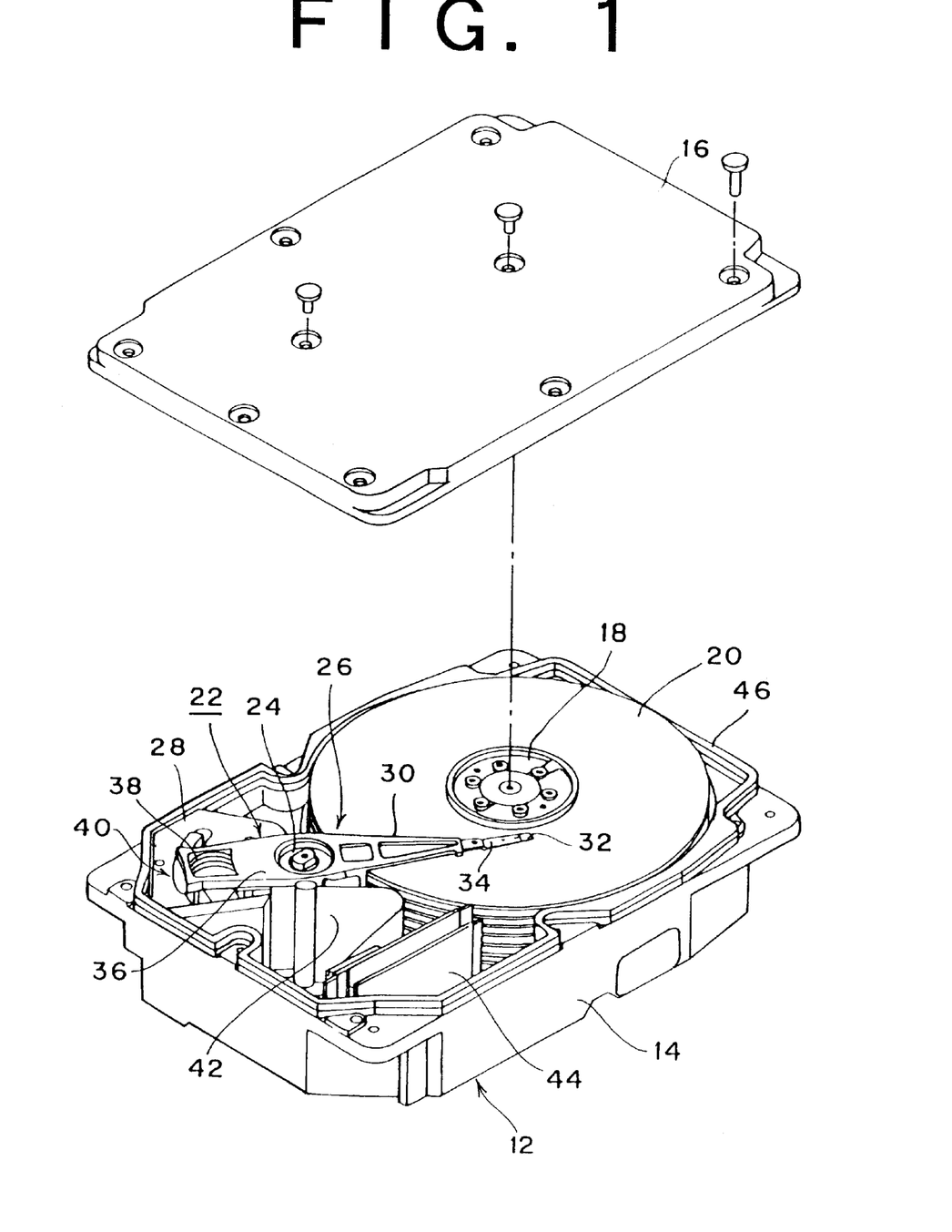
FIG. 1 is a perspective view of a magnetic disk drive according to a preferred embodiment of the present invention.

Referring to FIG. 1, there is shown a perspective view of a magnetic disk drive according to a preferred embodiment of the present invention. Reference numeral 12 denotes a housing (disk enclosure) consisting of a base 14 and a cover 16. A spindle hub (not shown) rotatably driven by an inner hub motor is provided on the base 14. A plurality of magnetic disks 20 each having a predetermined surface roughness and spacers (not shown) are mounted on the spindle hub in such a manner as to be alternately stacked. That is, the plural magnetic disks 20 are fixedly mounted on the spindle hub by securing a disk clamp 18 to the spindle hub by screws, and are equally spaced a given distance by the spacers.

Reference numeral 22 denotes a rotary actuator consisting of an actuator arm assembly 26 and a magnetic circuit 28. The actuator arm assembly 26 is mounted so as to be rotatable about a shaft 24 fixed to the base 14. The actuator arm assembly 26 includes a plurality of actuator arms 30 extending from the center of rotation in one direction and a coil supporting member 36 extending from the center of rotation in a direction opposite to the direction of extension of the actuator arms 30.

A suspension 34 is fixed at its base end portion to a front end portion of each actuator arm 30. A magnetic head slider 32 is supported to a front end portion of the suspension 34. A coil 38 is supported by the coil supporting member 36. The magnetic circuit 28 and the coil 38 inserted in a gap of the magnetic circuit 28 constitute a voice coil motor (VCM) 40.

Reference numeral 42 denotes a flexible printed circuit board (FPC) for taking a signal from an electromagnetic transducer mounted on the head slider 32. The flexible printed circuit board 42 is fixed at its intermediate portion by a fixing member 44, and is electrically connected to a connector (not shown). An annular packing assembly 46 is mounted on the base 14. The housing 12 is sealed by securing the cover 16 through the packing assembly 46 to the base 14 by screws.

Figure 2A:
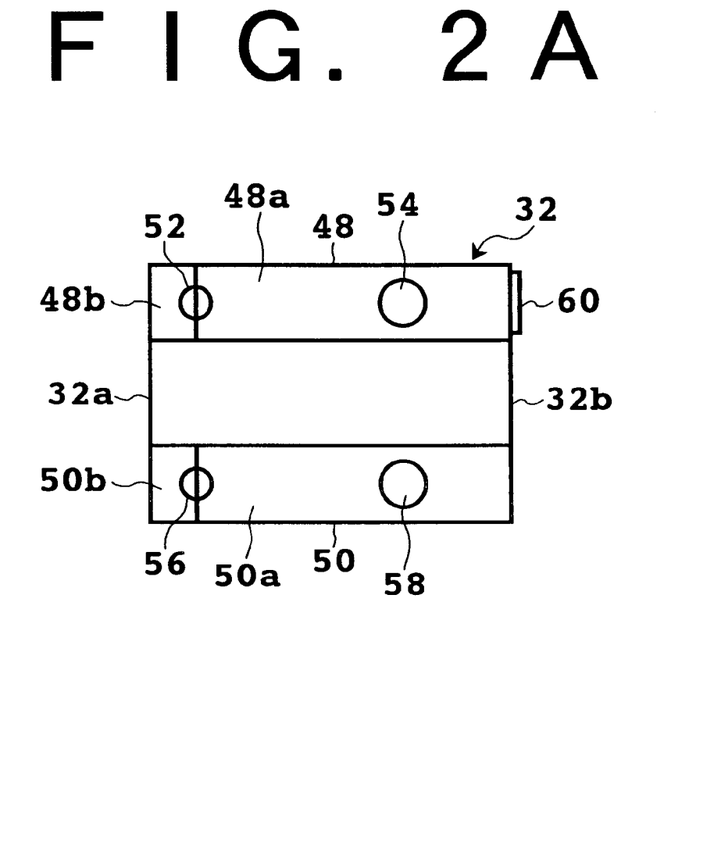
FIG. 2A is a bottom plan view of a magnetic head slider applicable to the present invention.
Figure 2B:
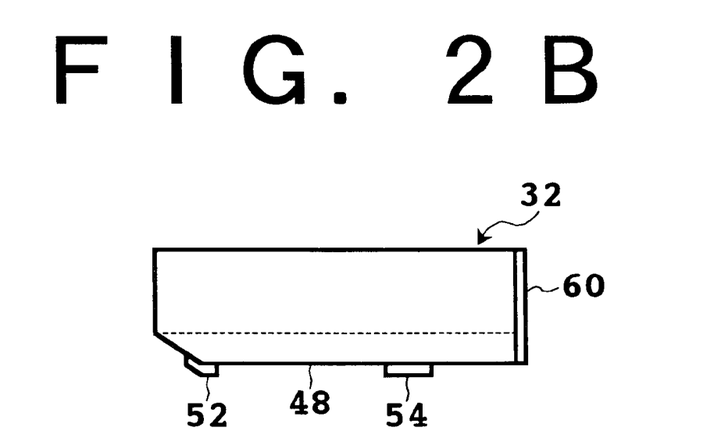
FIG. 2B is a side view of the magnetic head slider shown in FIG. 2A.

Referring to FIG. 2A, there is shown a bottom plan view of the magnetic head slider 32 shown in FIG. 1. FIG. 2B is a side view of the slider 32 shown in FIG. 2A. The magnetic head slider 32 has an air inlet end 32a and an air outlet end 32b. A pair of rails 48 and 50 are formed at opposite side portions of the slider 32 so as to extend over the length of the slider 32. The rails 48 and 50 have flat air bearing surfaces (flying surfaces) 48a and 50a, respectively. Two projections (pads) 52 and 54 are formed on the air bearing surface 48a of the rail 48, and two projections 56 and 58 are similarly formed on the air bearing surface 50a of the rail 50. The projections 52, 54, 56, and 58 are formed from a thin film of hard material such as diamond-like carbon (DLC), and they are formed on the rails 48 and 50 through an SiC layer as an adhesion layer having a thickness of 5 nm or less by a thin-film process. Tapering surfaces 48b and 50b are formed at air inlet end portions of the rails 48 and 50, respectively. An electromagnetic transducer (head element) 60 is formed on a portion of the air outlet end 32b adjacent to the rail 48.

Figure 3A:
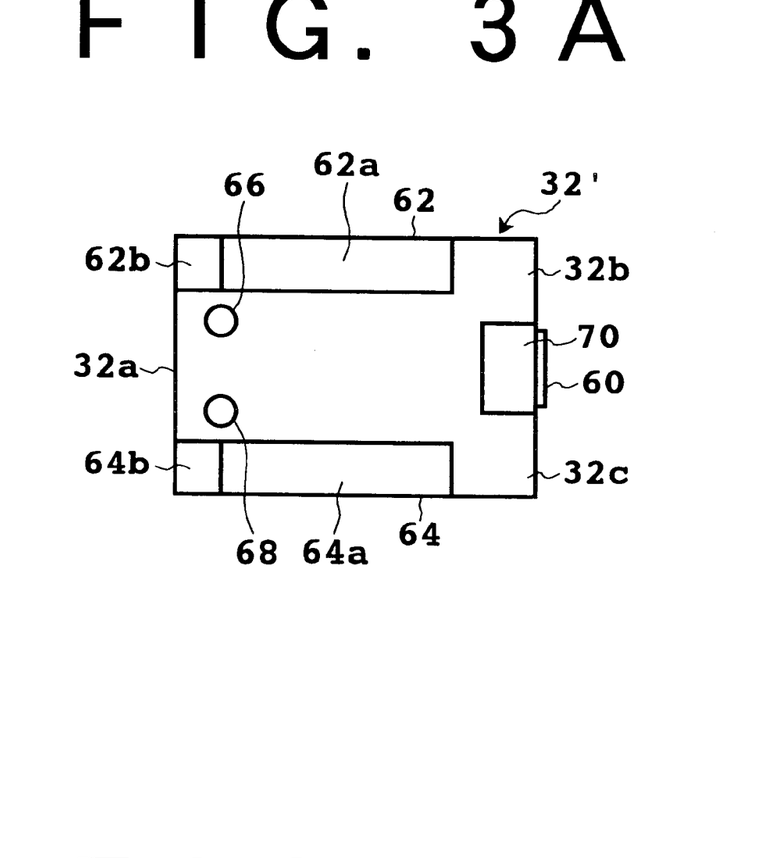
FIG. 3A is a bottom plan view of another magnetic head slider applicable to the present invention.
Figure 3B:
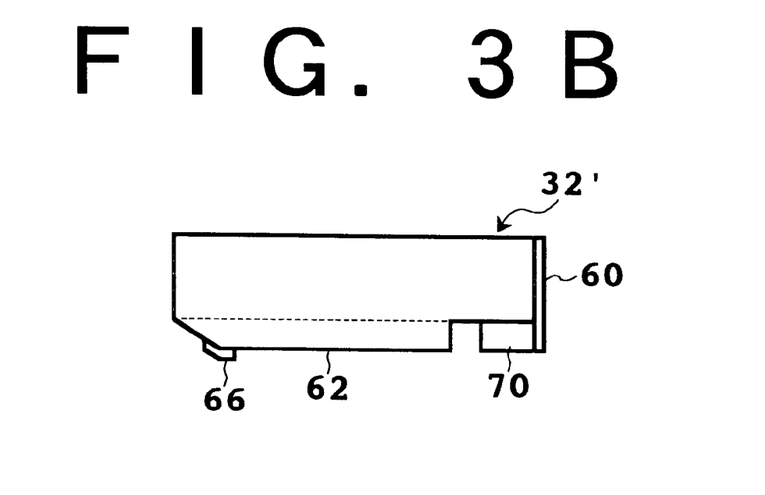
FIG. 3B is a side view of the magnetic head slider shown in FIG. 3A.

Referring to FIG. 3A, there is shown a bottom plan view of a magnetic head slider 32' applicable to another preferred embodiment of the present invention. FIG. 3B is a side view of the slider 32' shown in FIG. 3A. The magnetic head slider 32' has an air inlet end 32a and an air outlet end 32b. A pair of rails 62 and 64 are formed at opposite side portions of the slider 32' so as to extend from the air inlet end 32a to a position not reaching the air outlet end 32b. The rails 62 and 64 have flat air bearing surfaces 62a and 64a, respectively. Tapering surfaces 62b and 64b are formed at air inlet end portions of the rails 62 and 64, respectively. An electromagnetic transducer (head element) 60 is formed on the air outlet end 32b at its substantially central portion. In this preferred embodiment, three projections (pads) 66, 68, and 70 are formed on a portion of a disk opposing surface 32c of the slider 32' except the air bearing surfaces 62a and 64a. The projections 66, 68, and 70 are formed from a thin film of hard material such as DLC.

Figure 4A:
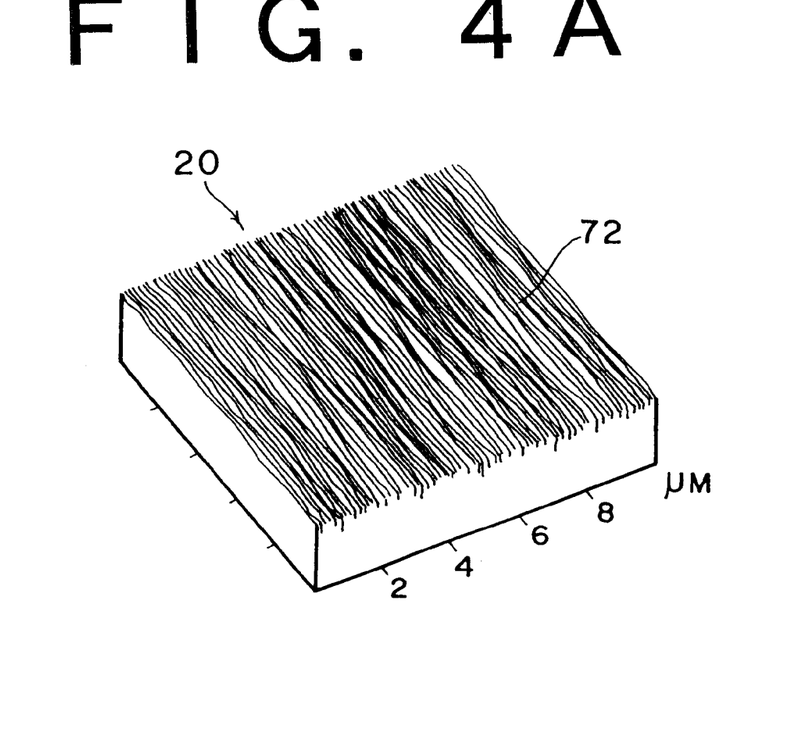
FIG. 4A is a perspective view showing a texture of the recording surface of a magnetic recording medium having an aluminum substrate as observed by using an atomic force microscope.
Figure 4B:
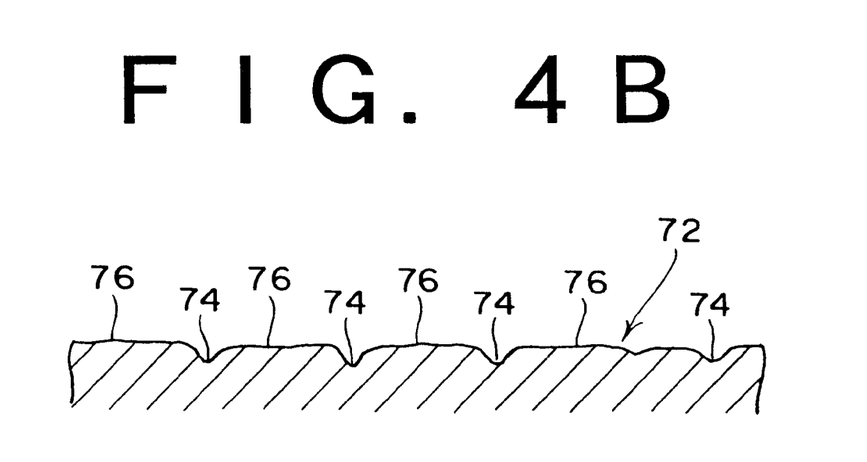
FIG. 4B is an enlarged sectional view of the texture shown in FIG. 4A.

Referring to FIG. 4A, there is shown a perspective view of the disk surface of the magnetic disk 20 having a unidirectional (anisotropic) texture 72 observed by using an atomic force microscope (AFM). FIG. 4B is an enlarged sectional view of the unidirectional texture 72 shown in FIG. 4A. The unidirectional texture 72 can be formed by machining (e.g., lapping) an aluminum disk substrate. The texture 72 is formed in the circumferential direction of the magnetic disk 20, and has such a shape that each of numerous thin ridgelike projections 76 are formed between adjacent grooves 74. The magnetic head slider 32 has a size of 1.2 mm×1 mm, and each of the projections 52, 54, 56, and 58 has a height of 40 nm. The total area of the projections 52, 54, 56, and 58 is 0.009 mm$^2$. The suspension load of the suspension 34 for pressing the magnetic head slider 32 on the magnetic disk 20 is 0.5 gf.

Figure 5:
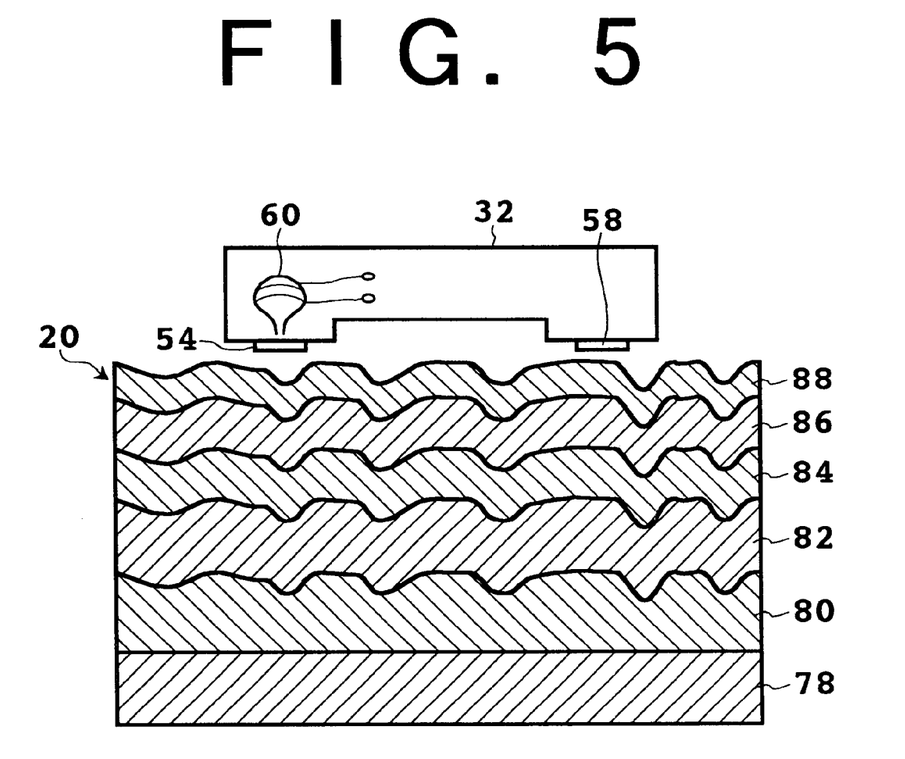
FIG. 5 is a sectional view of the magnetic recording medium.

Referring to FIG. 5, there is shown a sectional view of the magnetic disk 20. Reference numeral 78 denotes an aluminum substrate. A nonmagnetic plating layer 80 of Ni—P is formed on the aluminum substrate 78. The surface of the nonmagnetic plating layer 80 is formed with a substantially circumferential texture by machining using a lapping machine or the like. A Cr base film 82 is formed on the nonmagnetic plating layer 80. A metal magnetic film 84 of Co—Cr—Pt—Ta, Co—Cr—Pt—Ta—W, or the like is formed on the Cr base film 82.

A nonmagnetic protective film 86 of carbon, boron, or the like is formed on the metal magnetic film 84. Further, a lubricating layer 88 having a thickness of about 1 to 2 nm is formed on the nonmagnetic protective film 86. The lubricating layer 88 is formed of perfluoro polyether (PFPE), for example. In forming the texture on the surface of the nonmagnetic plating layer 80, the surface roughness of the magnetic disk 20 varies according to selection of a machining pressure and a slurry used. Not only the values of an average roughness Ra and a maximum height Rmax, but also the shapes of microscopic projections present in the roughness vary.

Such variations can be examined by measuring microscopic shapes of the surface of the magnetic recording medium with an atomic force microscope. FIGS. 6A to 6D show examples of measurement of the microscopic shapes. Each of these examples shown is a part of a profile curve of surface roughness. As apparent from FIG. 6A, the roughness profile curve has a property such that a small structure is superimposed on a large structure. By increasing a magnification of observation, it can be seen that a fine structure is superimposed on the small structure.

Figures 6A, 6B, 6C, 6D:
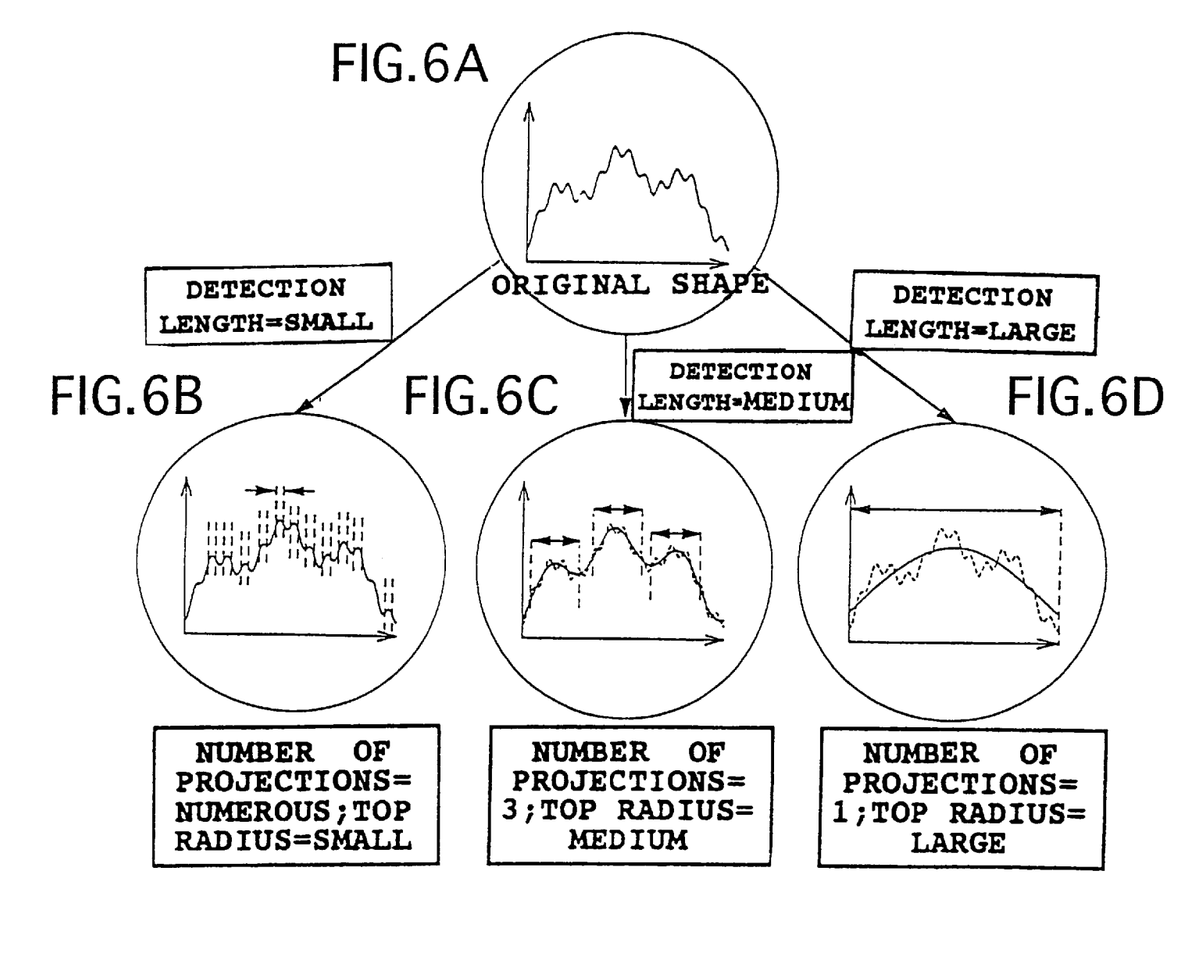
FIGS. 6A to 6D are illustrations for a surface roughness measuring method using a detection length adopted in the present invention.
Figure 7:
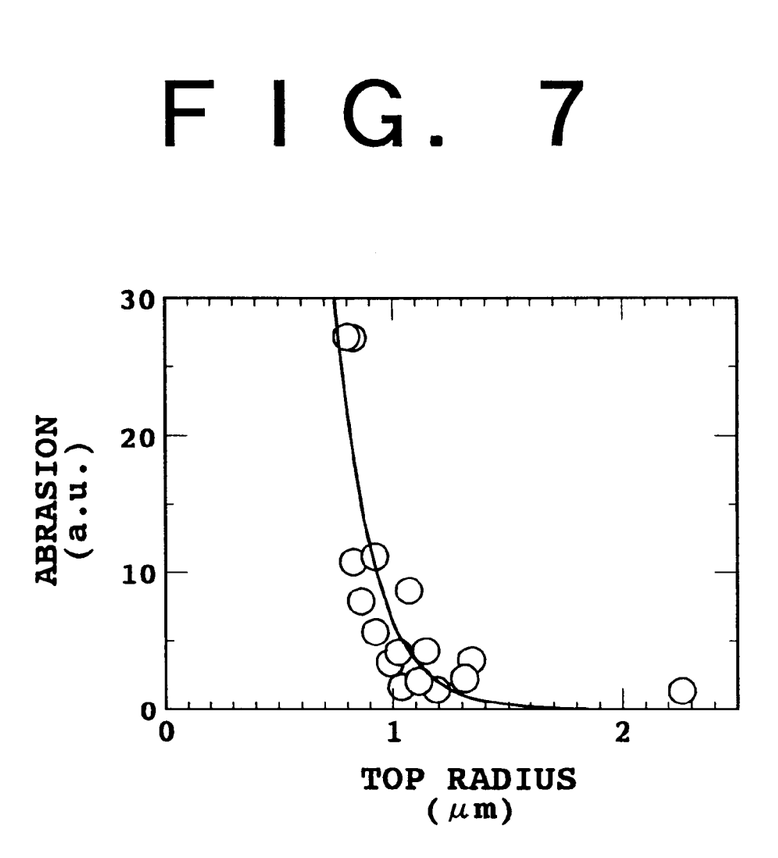
FIG. 7 is a graph showing the relation between an average top radius of microscopic projections formed on the magnetic recording medium and an abrasion of pads of the magnetic head slider.

As shown in FIGS. 6B, 6C, and 6D, the state of observation of microscopic projections varies according to settings of the magnification of observation. Detailed examination was made to clarify a relation between the size of each microscopic projection and the abrasion of the head slider due to the contact with the magnetic recording medium. FIG. 7 is a graph showing the result of this examination. In FIG. 7, the vertical axis represents an abrasion measured by an abrasion test, and the horizontal axis represents an average top radius of microscopic projections on the medium surfaces subjected to different texture formings, detected under specific and common observation conditions.

The average roughness Ra of the medium obtained by texture forming was in the range of 0.3 nm to 3 nm, and the maximum height Rmax was in the range of 0.6 nm to 30 nm. As apparent from FIG. 7, the larger the average top radius of the microscopic projections on the medium surface, the smaller the abrasion of the projections (pads) of the magnetic head slider in the above range of roughness. In the case that the average top radius of the microscopic projections is 1 μm or more, the abrasion becomes nearly zero.

The observation conditions for detecting the projection top radius having a size deeply relating to the abrasion will now be described. While a horizontal resolution in microscopy is not directly related with the present observation, excessively large or small values of the horizontal resolution are not desirable. For example, if a detection length (an index of smoothing defined in a horizontal direction) is set excessively small as shown in FIG. 6B, numerous projections are undesirably observed and a good correlation between the abrasion and the top radius cannot therefore be obtained.

Conversely, if the detection length is set excessively large as shown in FIG. 6D, only one projection is merely observed and a good correlation between the abrasion and the top radius cannot therefore be obtained. Accordingly, it is desirable to set the detection length to a medium value as shown in FIG. 6C. More specifically, it was found that by setting the detection length to a fixed value falling in the range of 150 nm to 600 nm, a good correlation between the abrasion and the top radius as shown in FIG. 7 can be obtained. The result shown in FIG. 7 was obtained in the case of adopting a fixed value of 312 nm as the detection length. The resolution of the atomic force microscope may be set to about 1/6 to 1/100 of the detection length, for example.

In obtaining the projection top radius, the measurement using the atomic force microscope is first made at plural points on one kind of medium. Then, the top radius of individual projections are calculated from the result of this measurement by using a fixed detection length in the above range. Further, the average of the top radii calculated above is calculated to be set as a typical value of the top radii of the projections in this medium. With several kinds of magnetic recording media in which the average top radius of microscopic projections was set to 1 $\mu$m or more, a reliability test was carried out by using an actual magnetic disk drive. As the result, no stiction occurred and the effectiveness of the present invention was confirmed.

There will now be described a projection detecting method using a threshold height. The algorithm of this method is summarized as follows:

(1) Decision of "peak candidates" by a nearest eight-point method.

(2) Decision of "projection area" about each peak candidate by using a threshold height.

(3) Calculation of a radius of curvature of each projection top by applying all data in the projection area to a quadratic surface.

In the step (2) of the above algorithm, the "projection area" is decided in the case that a cluster is formed by data points corresponding to heights equal to or greater than the value obtained by subtracting the "threshold height" from the height of each "peak candidate". The threshold height is set preferably to 0.3 nm to 0.5 nm, more preferably to 0.4 nm.

Figure 8A:
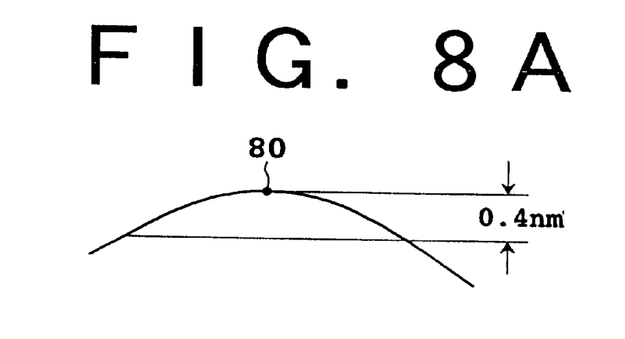
FIGS. 8A to 8C are illustrations for a surface roughness measuring method using a threshold height adopted in the present invention.
Figure 8B:
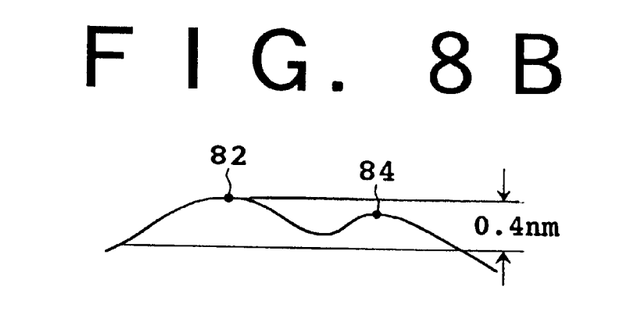

FIG. 8A shows an example in which a cluster is formed by data points corresponding to heights equal to or greater than the value obtained by subtracting the threshold height, 0.4 nm from the height of a peak 80. In this case, one projection area is decided. FIG. 8B shows another example in which two projections having peaks 82 and 84 are divided by a relatively shallow valley. In this case, the two projections having the peaks 82 and 84 are not regarded as two independent projections but are regarded as one large projection. That is, in the projection detecting method using the threshold height, two projections divided by a shallow valley having a depth smaller than a given depth (0.4 nm) are regarded as one large projection.

Figure 8C:
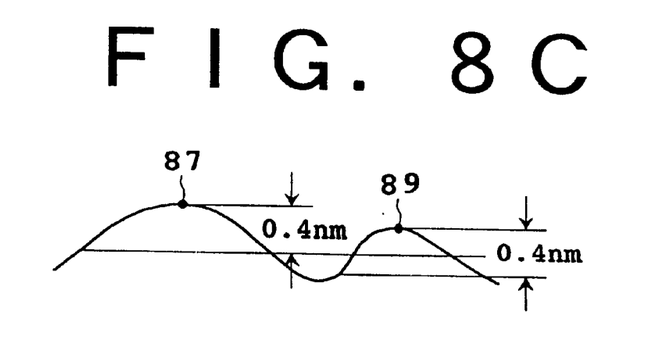

FIG. 8C shows still another example in which two projections having peaks 87 and 89 are divided by a sufficiently deep valley. In this case, the two projections having the peaks 87 and 89 are regarded as two independent projections. The surface roughness of the recording medium as detected by this method using the threshold height is similar to that obtained by the previous method using the detection length. That is, the surface roughness of the magnetic recording medium 20 is preferably composed of numerous microscopic projections having an average top radius of 1 $\mu$m or more when detected by using a fixed threshold height falling in the range of 0.3 nm to 0.5 nm.

Figure 9A:
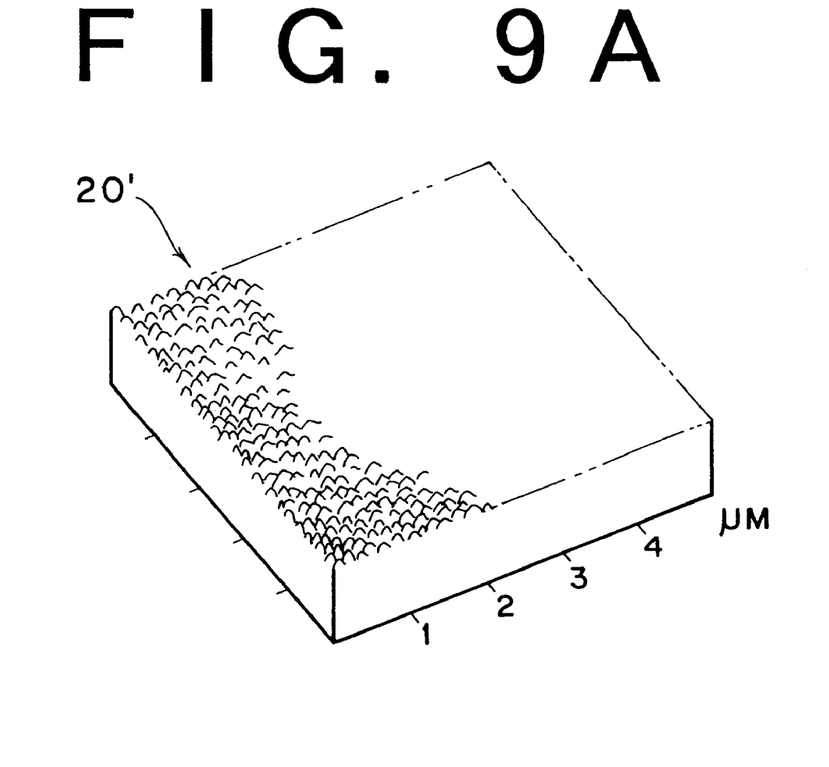
FIG. 9A is a perspective view showing another texture of the recording surface of a magnetic recording medium having a glass substrate as observed by using an atomic force microscope.
Figure 9B:
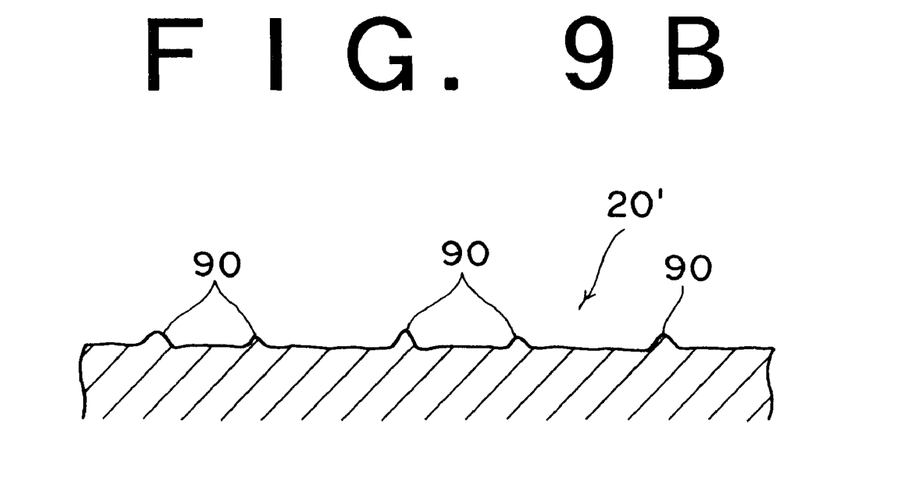
FIG. 9B is an enlarged sectional view of the texture shown in FIG. 9A.

Referring to FIG. 9A, there is shown a perspective view of the disk surface of a magnetic disk 20' having a glass substrate as observed with an atomic force microscope, in which hundreds of microscopic projections are seen. FIG. 9B is an enlarged sectional view of the disk surface shown in FIG. 9A. In this preferred embodiment, numerous microscopic projections 90 are distributed two-dimensionally on the disk surface of the magnetic disk 20'. According to the projection detecting method using the threshold height as mentioned above, isotropic (nondirectional) domelike projections as shown in FIG. 9A can also be handled like the strongly anisotropic (unidirectional) ridgelike projections as shown in FIG. 4A.

In this preferred embodiment, the magnetic disk 20' as a magnetic recording medium has a nondirectional texture. The nondirectional texture is defined as a texture in which microscopic projections each having a minor axis/major axis ratio of 0.5 or more are present in an amount of 55% or more of all microscopic projections. Preferably, the magnetic disk 20' has a surface roughness composed of numerous microscopic projections having an average top radius of 0.3 $\mu$m to 0.75 $\mu$m when detected by using a fixed threshold height falling in the range of 0.3 nm to 0.5 nm, e.g., a fixed threshold height of 0.4 nm.

When the average top radius of the microscopic projections is in the range of 0.3 $\mu$m to 0.75 $\mu$m, the abrasion of the projections (pads) of the magnetic head slider 32 can be suppressed. The above range of the average top radius is defined as a range of top radii of microscopic projections measured along their major axes. As similar to the magnetic recording medium 20 according to the first preferred embodiment, the magnetic recording medium 20' according to this preferred embodiment has a surface roughness with an average roughness Ra of 0.3 nm to 3 nm and a maximum height Rmax of 0.6 nm to 30 nm.

In the magnetic recording medium 20' having a glass substrate according to this preferred embodiment, it was confirmed that a good correlation between the top radius of each microscopic projection and the abrasion of the pads of the magnetic head slider can be obtained by setting the detection length to a fixed value falling in the range of 40 nm to 150 nm. By setting the detection length to a fixed value falling in the range of 40 nm to 150 nm, e.g., to a fixed value of 80 nm, for example, a preferable average top radius of 0.3 $\mu$m to 0.75 $\mu$m can be obtained like that obtained by the projection detecting method using the threshold height as mentioned above.

The above range of the average top radius of the microscopic projections on the surface of the magnetic recording medium is similar to the magnetic head slider 32' shown in FIGS. 3A and 3B. That is, it was confirmed that a similar effect can be obtained also in the case that the projections (pads) for avoiding the stiction are provided on a portion of the medium opposing surface except the air bearing surfaces of the slider.

Since the present invention is essentially intended to suppress the generation of dust and the abrasion of the pads due to the contact of the magnetic head slider and the magnetic recording medium, the above surface roughness of the magnetic recording medium is applied necessarily to at least a portion (CSS zone) of the medium surface related with the CSS operation. However, by applying the surface roughness to the whole of the medium surface, the reliability of the disk drive can be further improved. That is, since the contact of the magnetic head slider and the magnetic recording medium may occur with a low probability even in a normal operation of the disk drive (during rotation of the magnetic disk), the generation of dust due to the contact can be minimized by applying the surface roughness over the entire medium surface. In this case, it is greatly effective to apply the present invention to a magnetic disk drive so designed as not to perform the CSS operation.

According to the present invention as described above, the stiction between the magnetic head slider and the magnetic disk can be reduced to thereby achieve a smooth CSS operation, thus reducing the abrasion of the surface of the magnetic disk. Furthermore, the abrasion of the projections provided on the medium opposing surface of the magnetic head slider can also be reduced. Accordingly, the total amount of dust generated in the magnetic disk drive can be remarkably reduced. As a result, adverse effects of a minute amount of dust present or possibly generated in the magnetic disk drive upon the flying characteristics of the magnetic head slider can be prevented to thereby remarkably improve the reliability of the magnetic disk drive.

What is claimed is:

1. A magnetic disk drive comprising:
   a housing;
   a magnetic recording medium rotatably mounted in said housing;
   a magnetic head slider having an electromagnetic transducer for reading/writing date from/to said magnetic recording medium;
   an actuator for moving said magnetic head slider across tracks of said magnetic recording medium;
   said magnetic head slider having a medium opposing surface opposed to said magnetic recording medium;
   a pair of rails formed on said medium opposing surface, each said rail having an air bearing surface; and
   a plurality of pads formed on said magnetic head slider, said pads being configured and adapted to make sliding contact with said recording medium and prevent said air bearing surface from contacting said magnetic recording medium;
   said magnetic recording medium having a textured surface, said textured surface being formed from a plurality of alternating ridges and grooves extending substantially along a circumferential direction of said recording medium, said ridges having numerous microscopic projections having an average top radius of at least 1 $\mu$m, said textured surface being and configured and adapted to prevent abrasion of said pads as said pads slide on said recording medium.

2. A magnetic disk drive according to claim 1, wherein said projections have an average roughness Ra of 0.3 nm to 3 nm and a maximum height Rmax of 0.6 nm to 30 nm.

3. A magnetic disk drive according to claim 1, wherein said plurality of pads are formed on said air bearing surface.

4. A magnetic disk drive according to claim 1, wherein said plurality of pads are formed on a potion of said medium opposing surface.

5. A magnetic disk drive according to claim 1, wherein said textured surface is formed on only a part of said magnetic recording medium.

* * * * *

UNITED STATES PATENT AND TRADEMARK OFFICE
CERTIFICATE OF CORRECTION

PATENT NO.     : 6,396,661 B1
DATED          : May 28, 2002
INVENTOR(S)    : Yokohata et al.

It is certified that error appears in the above-identified patent and that said Letters Patent is hereby corrected as shown below:

<u>Column 9,</u>
Line 34, please delete "reading/writing date" and insert -- reading/writing data --

<u>Column 10,</u>
Line 30, please delete "potion" and insert -- portion --

Signed and Sealed this

Eighteenth Day of March, 2003

JAMES E. ROGAN
*Director of the United States Patent and Trademark Office*